(12) United States Patent
Magnusson et al.

(10) Patent No.: US 11,757,276 B2
(45) Date of Patent: Sep. 12, 2023

(54) FAULT CURRENT LIMITER CIRCUIT BREAKER

(71) Applicant: ABB Schweiz AG, Baden (CH)

(72) Inventors: Jesper Magnusson, Åkersberga (SE); Johan Nohlert, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/906,058

(22) PCT Filed: Feb. 1, 2021

(86) PCT No.: PCT/EP2021/052320
§ 371 (c)(1),
(2) Date: Sep. 9, 2022

(87) PCT Pub. No.: WO2021/180397
PCT Pub. Date: Sep. 16, 2021

(65) Prior Publication Data
US 2023/0124793 A1    Apr. 20, 2023

(30) Foreign Application Priority Data
Mar. 10, 2020    (EP) .................................... 20162221

(51) Int. Cl.
*H02H 9/08* (2006.01)
*H02H 3/02* (2006.01)
*H02H 7/22* (2006.01)

(52) U.S. Cl.
CPC .............. *H02H 3/025* (2013.01); *H02H 7/22* (2013.01)

(58) Field of Classification Search
CPC ................................. H02H 3/025; H02H 7/22
(Continued)

(56) References Cited

U.S. PATENT DOCUMENTS 5,650,901 A * 7/1997 Yamamoto ........... H03K 17/725
361/13
6,239,514 B1   5/2001 Isberg et al.
(Continued)

FOREIGN PATENT DOCUMENTS

EP    2963751 A1    1/2016
EP    3229252 A1    10/2017
(Continued)

OTHER PUBLICATIONS

Extended European Search Report; Application No. 20162221.4; Completed: Sep. 4, 2020; dated Sep. 15, 2020; 5 Pages.
(Continued)

*Primary Examiner* — Danny Nguyen
*Assistant Examiner* — Lucy M Thomas
(74) *Attorney, Agent, or Firm* — WHITMYER IP GROUP LLC (57) ABSTRACT

A method of operating a Fault Current Limiter Circuit Breaker including a plurality of FLCB modules connected in series, including at least a first module and a second module. Each module has a plurality of parallel component legs including a mechanical switch leg having a mechanical switch, a semiconductor switch leg having a semiconductor switch, and a Metal Oxide Varistor leg having a MOV. The method includes, when the FLCB is in an open configuration, obtaining an indication that the FLCB should be closed; in response to the obtained indication, closing the semiconductor switch of each of the modules; and, after the closing of the semiconductor switches and while the mechanical switch of the second module remains open, closing the mechanical switch of the first module.

15 Claims, 3 Drawing Sheets

(58) Field of Classification Search
USPC .......................................................... 361/93.9
See application file for complete search history.

(56) References Cited

U.S. PATENT DOCUMENTS

| | | | |
|---|---|---|---|
| 6,518,865 B1* | 2/2003 | Al-Hosini | H01H 33/285 |
| | | | 335/147 |
| 8,717,716 B2 | 5/2014 | Häfner et al. | |
| 8,891,209 B2 | 11/2014 | Häfner et al. | |
| 9,208,979 B2 | 12/2015 | Häfner et al. | |
| 10,096,989 B2 | 10/2018 | Lee et al. | |
| 10,454,265 B2 | 10/2019 | Cao et al. | |
| 2005/0146814 A1* | 7/2005 | Sellier | H01H 9/542 |
| | | | 361/8 |
| 2012/0299393 A1* | 11/2012 | Hafner | H01H 9/548 |
| | | | 307/113 |
| 2016/0006236 A1 | 1/2016 | Tang et al. | |
| 2017/0085121 A1* | 3/2017 | Cairoli | H02J 9/061 |
| 2018/0006548 A1* | 1/2018 | Santi | H02M 7/4835 |
| 2018/0226882 A1* | 8/2018 | Jonsson | H02M 7/4835 |

FOREIGN PATENT DOCUMENTS

| | | |
|---|---|---|
| EP | 3270397 A1 | 1/2018 |
| EP | 3407446 A1 | 11/2018 |
| WO | 2014053554 A1 | 4/2014 |

OTHER PUBLICATIONS

International Search Report and Written Opinion of the International Searching Authority; Application No. PCT/EP2021/052320; Completed: Apr. 14, 2021; dated Apr. 22, 2021; 13 Pages.

\* cited by examiner

FAULT CURRENT LIMITER CIRCUIT BREAKER

TECHNICAL FIELD

The present disclosure relates to a Fault Current Limiter Circuit Breaker (FLCB) and a method of operating an FLCB.

BACKGROUND

An FLCB can be used in power systems where extra generation is installed so that a short circuit current in the system exceeds the rating of the existing system. Instead of upgrading the whole system, an FLCB can be installed to limit the peak current in the system to within the rated limits. One such solution is the hybrid FLCB where the fast switching of power semiconductors is combined with the low conduction losses of mechanical switches. The mechanical switch carries the nominal current with low losses, and in the case of a fault, the mechanical switch opens and commutates the current into the semiconductor connected in parallel. The semiconductor will then carry the rising fault current for a short while to let the mechanical switch open fully to avoid arcing. When the semiconductor is turned off, the mechanical switch has to withstand the transient over voltage during the time the current is forced to zero.

Also, the closing sequence of a hybrid circuit breaker is made in steps. Firstly, the semiconductor is turned on so that the current starts to flow. If the system is faulty, the current will rise quickly and the FLCB is tripped again. The current can then be interrupted immediately since the mechanical switch is still open. If there is no fault in the system, the mechanical switch should be closed since the semiconductor can only carry the nominal system current for about a second without overheating.

A problem arises if a fault occurs during the closing of the mechanical switch. Since the mechanical switch is not in its closed position, it cannot be opened to commutate the current into the semiconductor. Once the mechanical switch has closed, it needs several tens of milliseconds before it can be opened and interrupt the current. During this time, the system fault current will reach its full prospective current and the FLCB will have failed to serve its purpose. Hence, it cannot be guaranteed that the FLCB will fulfil its task at all times.

SUMMARY

It is an objective of the present invention to improve the reliability of a hybrid FLCB.

According to an aspect of the present invention, there is provided a method of operating a Fault Current Limiter Circuit Breaker (FLCB) comprising a plurality of FLCB modules connected in series, including at least a first module and a second module. Each module comprises a plurality of parallel component legs comprising a mechanical switch leg comprising a mechanical switch, a semiconductor switch leg comprising a semiconductor switch, and a Metal Oxide Varistor (MOV) leg comprising a MOV. The method comprises, when the FLCB is in an open configuration, obtaining an indication that the FLCB should be closed; in response to the obtained indication, closing the semiconductor switch of each of the modules; and, after the closing of the semiconductor switches and while the mechanical switch of the second module remains open, closing the mechanical switch of the first module.

According to another aspect of the present invention, there is provided a computer program product comprising computer-executable components for causing a controller to perform an embodiment of the method of the present disclosure when the computer-executable components are run on processing circuitry comprised in the controller.

According to another aspect of the present invention, there is provided an FLCB comprising a plurality of FLCB modules connected in series. The series connected modules include at least a first module and a second module. Each module comprises a plurality of parallel component legs including a mechanical switch leg comprising a mechanical switch, a semiconductor switch leg comprising a semiconductor switch, a MOV leg comprising a MOV, and a controller comprising processing circuitry, and data storage storing instructions executable by said processing circuitry whereby said controller is operative to, when the FLCB is in an open configuration, obtain an indication that the FLCB should be closed. The controller is also operative to, in response to the obtained indication, close the semiconductor switch of each module. The controller is also operative to, while the semiconductor switches are closed and the mechanical switch of the second module remains open, close the mechanical switch of the first module. The FLCB may thus be configured for performing an embodiment of the method of the present disclosure.

According to another aspect of the present invention, there is provided a power distribution network comprising an embodiment of the FLCB of the present disclosure.

By closing the mechanical switches in sequence, wherein the mechanical switch of the second module remains open while the mechanical switch of the first module is being closed. Since it takes a few milliseconds (ms) for the mechanical switch to close, i.e., the switching duration of the mechanical switch, and the mechanical switch may be unable to open again for another duration of tens of ms (e.g., up to 100 ms) after closing, the sequential closing in accordance with the present invention enables operation of the FLCB to limit fault currents also when a fault is detected during the closing of the FLCB. The semiconductor switches enable very fast closing or opening of the FLCB but may only be able to carry a current for a limited time, e.g., at most 1 s for nominal current, without overheating and are also used in closed configuration for preventing arcing when the mechanical switches are opened. When both the mechanical switch and the semiconductor switch of a module are open, the fault current is directed to the MOV of that module which reduces the voltage and absorbs the energy of the fault current.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Herein, the term "open" is used for a switch (be it a mechanical or semiconductor switch) which is non-conducting (corresponding to a semiconductor switch being turned OFF), while the term "closed" is used for a switch which is conducting (corresponding to a semiconductor switch being turned ON).

Figure 1:
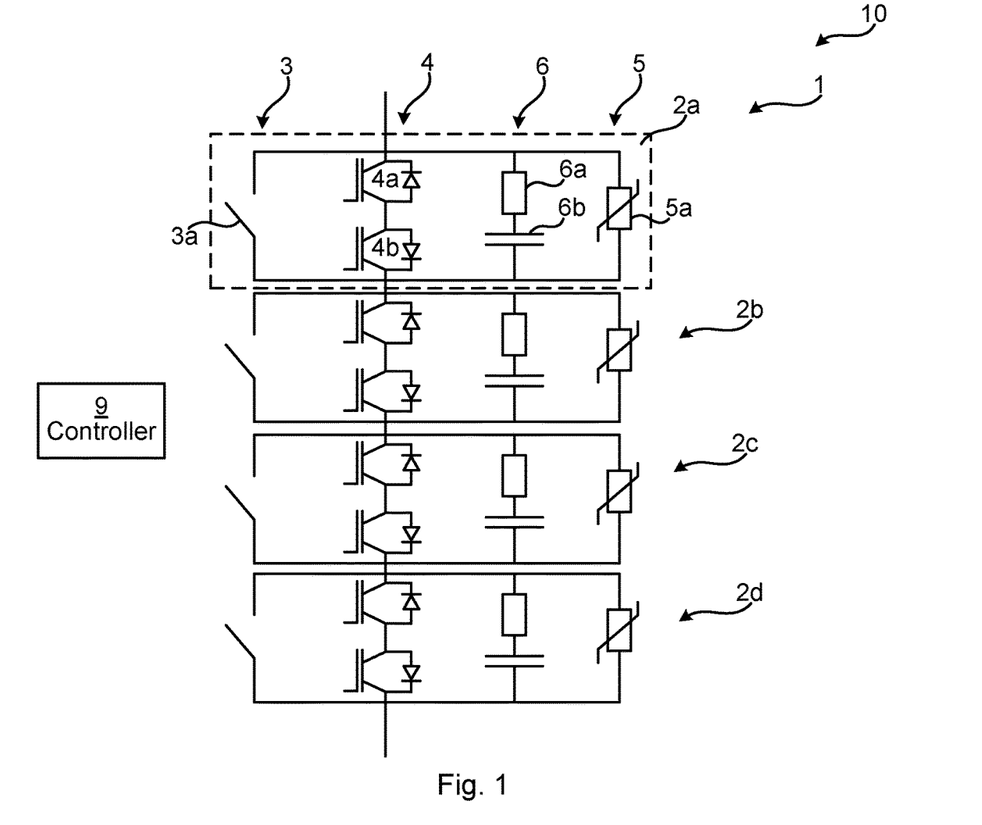
FIG. 1 is a schematic circuit diagram of an FLCB being connected in a power distribution network, in accordance with some embodiments of the present invention.

FIG. 1 illustrates an FLCB 1 comprising a plurality of modules 2 connected in series with each other. The FLCB 1 comprises at least a first and a second series connected modules 2a and 2b, e.g., within the range of from two to ten modules, for example four modules 2a, 2b, 2c and 2d as in the embodiment of the figure. The first and second modules 2a and 2b, as discussed herein, may be any neighbouring (i.e., directly connected to each other without any other module there between) modules among the plurality of series connected modules. The FLCB is able to break and absorb/consume fault (e.g., short circuit) currents, e.g., in a power distribution network 10, to prevent the current from rising above what the existing circuit breakers can handle. This functionality makes it possible to perform network extensions without the need for upgrading equipment such as switchgear, cables, or transformers. Especially the recent need for connecting renewable energy sources such as solar and/or wind energy sources may give rise to high fault currents. The FLCB 1 may be comprised in such a power distribution network 10. The power distribution network may be configured for a nominal voltage within the medium voltage (MV) range, e.g., for a nominal voltage of at least 1 kV, e.g., within the range of 2 kV and 35 kV.

Each module 2 comprises a plurality of parallel component legs comprising a mechanical switch leg 3 comprising a mechanical switch 3a, a semiconductor switch leg 4 comprising a semiconductor switch 4a or 4b, and a MOV leg 5 comprising a MOV 5a. Optionally, the plurality of parallel legs also comprises a snubber leg 6 comprising a snubber, e.g., an RC snubber comprising resistance 6a and a capacitance 6b connected in series with each other.

The mechanical switch 3a of each module, may be any suitable mechanical switch which can move to break and close a galvanic connection in the mechanical switch leg 3. Preferably, the mechanical switch is or comprises a Thomson switch, which is an example of a mechanical switch having a relatively short switching duration. A short switching duration of the mechanical switch, i.e., the period of time during which the mechanical switch moves from its open position to its closed position, or vice versa, is preferred in order for the FLCB to be able to more quickly handle a detected fault current. The mechanical switch may e.g., have a switching duration within the range of 5-10 milliseconds (ms). A mechanical switch has the advantage of low conduction losses and ability to handle relatively large currents in relation to cost compared with the semiconductor switch 4a or 4b. A disadvantage of the mechanical switch is that it is relatively slow, i.e., has a relatively long switching duration compared with the semiconductor switch.

The semiconductor switch leg 4 comprises at least one semiconductor 4a or 4b which is primarily configured to react faster than the mechanical switch 3a during opening or closing of the FLCB, but typically only to conduct a current (fault or nominal current) for a limited time period during the opening or closing of the mechanical switch. For instance, the semiconductor switch may only conduct a current for at most 1 second (s) to avoid overheating. The semiconductor switch may have a relatively short switching duration, such as less than 20 microseconds (µs), e.g., within the range of 5-15 µs. The semiconductor switch 4a or 4b typically is or comprises an active turn-off semiconductor switch, e.g., an Insulated-Gate Bipolar Transistor (IGBT), a Bi-Mode Insulated Gate Transistor (BiGT), a Gate Turn-Off Thyristor (GTO) or an Integrated Gate-Commutated Thyristor (IGCT), typically with an anti-parallel diode. In some embodiments BiGT is preferred. It may be advantageous that the FLCB, and thus each module 2 thereof, is bidirectional, especially for alternating current (AC) network applications, in which case two semiconductor switches 4a and 4b, connected in series with each other, having different polarities may be comprised in the semiconductor switch leg 4, e.g., two BiGT of different polarities as in the figure. In case the semiconductor switch leg 4 comprises more than one semiconductor switch 4a and 4b, that a semiconductor switch is open or closed as discussed herein implies that a relevant semiconductor switch (e.g., dependent on polarity of the current) for controlling the conductivity of the semiconductor switch leg 4 is opened or closed (or is opening or closing).

The MOV 5a is arranged for consuming (also called absorbing) the electrical power of the fault current when said current is directed through the MOV of a module as a result of both of the mechanical switch and the semiconductor switch of that module being open.

The FLCB 1 may also comprise a controller for controlling the operation of the FLCB, especially the opening and closing of the mechanical switches 3a and the semiconductor switches 4a and 4b of the modules 2, e.g., for enabling the FLCB to perform the method of the present disclosure.

Figure 2:
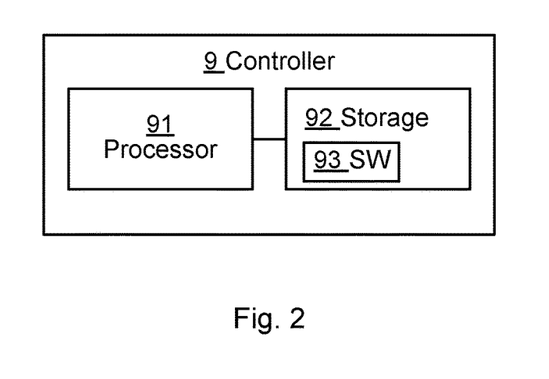
FIG. 2 is a schematic block diagram of an embodiment of a controller of an FLCB, in accordance with some embodiments of the present invention.

FIG. 2 illustrates a controller 9. The controller 9 comprises processing circuitry 91 e.g., a central processing unit (CPU). The processing circuitry 91 may comprise one or a plurality of processing units in the form of microprocessor(s). However, other suitable devices with computing capabilities could be comprised in the processing circuitry 91, e.g., an application specific integrated circuit (ASIC), a field programmable gate array (FPGA) or a complex programmable logic device (CPLD). The processing circuitry 91 is configured to run one or several computer program(s) or software (SW) 93 stored in a storage 92 of one or several storage unit(s) e.g., a memory. The storage unit is regarded as a computer readable means 92, forming a computer program product together with the SW 93 stored thereon as computer-executable components, as discussed herein and may e.g., be in the form of a Random Access Memory (RAM), a Flash memory or other solid-state memory, or a hard disk, or be a combination thereof. The processing circuitry 91 may also be configured to store data in the storage 92, as needed.

Figure 3:
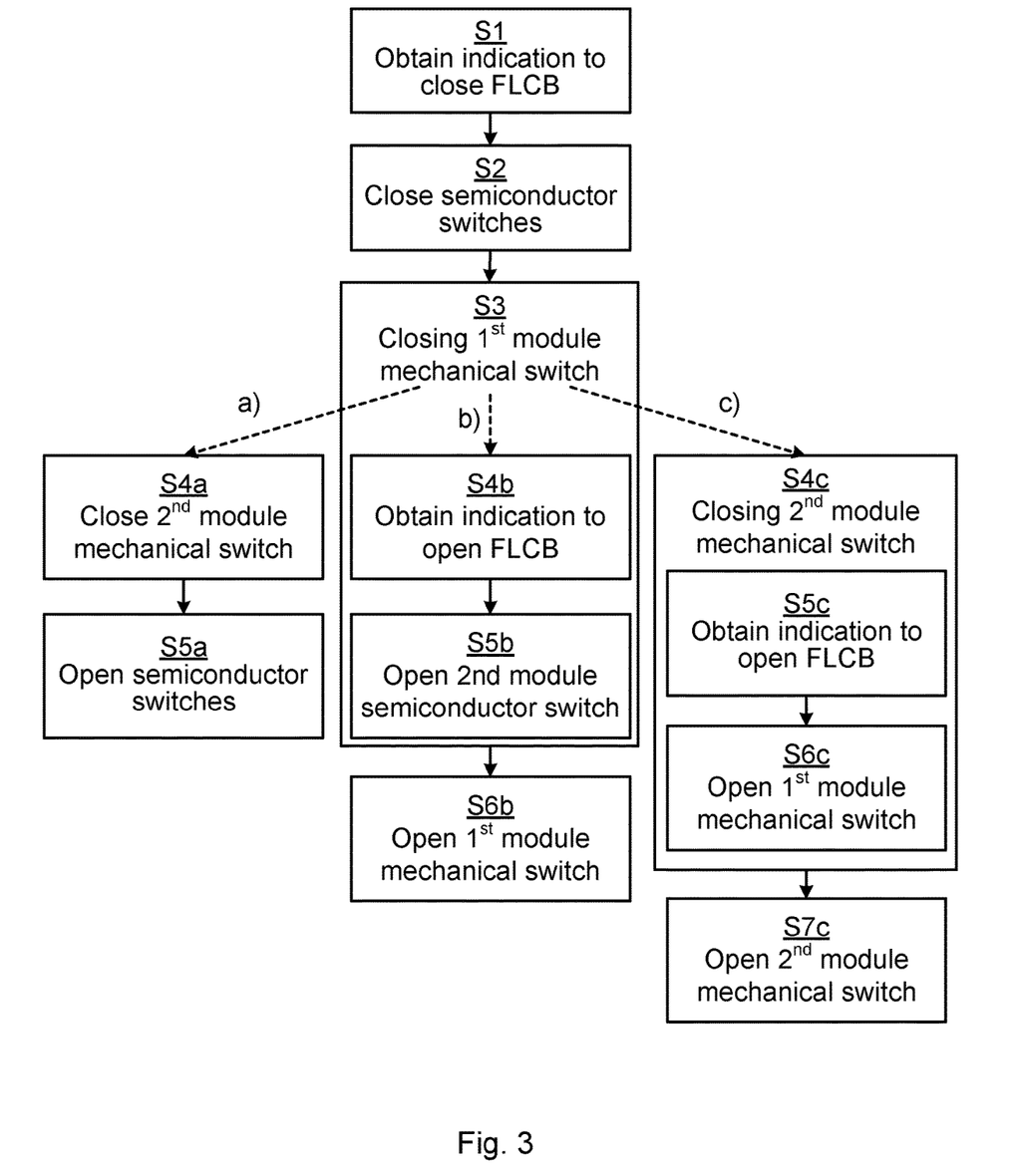
FIG. 3 is a schematic flow chart of some embodiments of a method of the present invention.

FIG. 3 illustrates some embodiments of the method of operating an FLCB 1 in accordance with the present invention.

When the FLCB is in an open configuration, i.e., when the mechanical switch 3a and the semiconductor switch 4a or 4b of each of the modules 2 are open, an indication that the FLCB should be closed (i.e., conducting via each of its modules) is obtained S1. In response to the obtained S1 indication, the semiconductor switch 4a or 4b of each of the modules 2 are closed S2, typically all at the same time. After the closing S2 of the semiconductor switches 4a or 4b, while the mechanical switch 3a of the second module 2b remains open, the mechanical switch 3a of the first module 2a is being closed S3. As discussed herein, the switching duration of the mechanical switch is relatively long, e.g., within the range of 5-10 ms, allowing the semiconductor switches to (if desired) switch again while the mechanical switch 3a of the first module 2a is closing S3.

In some embodiments of the present invention, option a), e.g., when there is no fault current detected during the closing of the FLCB, the mechanical switch 3a of the second module 2b is being closed S4a, after the closing S3 of the mechanical switch 3a of the first module 2a, i.e., after the mechanical switch of the first module has reached its closed position (conducting). Then, when the mechanical switch of each of the plurality of modules has been closed S3 and S4a (i.e., have reached their closed positions and are conducting), the respective semiconductor switch 4a or 4b of each of the modules 2 are opened S5a. When the respective mechanical switch of each of the modules is in its closed position, the FLCB is closed and conducts via each of the respective mechanical switch of the series connected modules. To avoid overheating of the semiconductor switches, and to reduce conduction losses, the semiconductor switches of each of the modules are opened when the FLCB is closed.

In some other embodiments of the present invention, option b), a fault current is detected or presumed (providing an indication that the FLCB should be re-opened) during the closing S3 of the mechanical switch of the first module. Thus, an indication that the FLCB 1 should be opened is obtained S4b during the closing S3 of the mechanical switch 3a of the first module 2a, while the mechanical switch 3a of the second module 2b remains open (has not yet started to close, since the mechanical switches are closed in sequence). In response to the obtaining S4b of the indication that the FLCB 1 should be opened, the semiconductor switch 4a or 4b of the second module 2b is opened S5b, forcing the fault current through the MOV 5a of the second module 2b. Then, after the opening S5b of the semiconductor switch 4a or 4b of the second module 2b, the mechanical switch 3a of the first module 2a is opened. Typically, the mechanical switch of the first module has first finished closing S3 (conducting) before it is opened S6b. During the closing S3 of the mechanical switch of the first module, the semiconductor switch of the first module may remain closed, to avoid arcing at the mechanical switch. After the mechanical switch of the first module has opened sufficiently to avoid arcing, also the semiconductor switch 4a or 4b of the first module 2a may be opened. Thus, if a fault current is detected during the closing of the mechanical switch of the first module, the current can by means of some embodiments of the present invention anyway be quickly broken in the second module since the mechanical switch of the second module remains open and the semiconductor switch of the second module can quickly be opened S5b, directing the fault current to the MOV of the second module.

In some other embodiments of the present invention, option c), a fault current is detected or presumed (providing an indication that the FLCB should be re-opened) during the closing S4c of the mechanical switch of the second module, the second module mechanical switch being closed in sequence after the first module mechanical switch has reached its closed position in response to the obtained S1 indication to close the FLCB. Thus, after the closing S3 of the mechanical switch 3a of the first module 2a, the mechanical switch 3a of the second module 2b is being closed S4c. Then, during the closing S4c of the mechanical switch 3a of the second module 2b, while the mechanical switch 3a of the first module 2a remains closed (it has already been closed S3), an indication that the FLCB 1 should be opened is obtained S5c, typically due to the detection of a fault current. In response to the obtaining S5c of the indication that the FLCB 1 should be opened, the mechanical switch 3a of the first module 2a, as well as the semiconductor switch 4a or 4b of the first module, are opened S6c, forcing the fault current through the MOV 5a of the first module 2b. Then, after the opening S6c of the semiconductor switch 4a or 4b of the first module 2a, and typically also of the mechanical switch 3a of the first module (though alternatively, it may be during the opening of the mechanical switch of the first module), the mechanical switch 3a of the second module 2b is opened S7c. After the mechanical switch of the second module has opened sufficiently to avoid arcing, also the semiconductor switch 4a or 4b of the second module 2a may be opened. Thus, if a fault current is detected during the closing of the mechanical switch of the second module, after the closing of the mechanical switch of the first module, the current can by means of some embodiments of the present invention anyway be quickly broken in the first module since the mechanical switch of the first module is in its closed position and can be re-opened S6c and the semiconductor switch of the first module can also quickly be opened, directing the fault current to the MOV of the first module.

In some embodiments of the present invention, during the closing S3 or S4c of a mechanical switch 3a and after the obtaining S4b or S5c of an indication that the FLCB should be opened, also the semiconductor switch 4a or 4b of the same module as the closing S3 or S4c mechanical switch may be opened, forcing the fault current through the MOV 5a of also that module until the mechanical switch has closed (i.e., has provided a galvanic connection). To avoid arcing as the mechanical switch reaches its closed position, the semiconductor switch may then re-close during the closing S3 or S4c of the mechanical switch, typically just before the mechanical switch reaches its closed position and thus provides a galvanic connection. Since the switching time of the semiconductor switch is so much faster than the switching time of the mechanical switch, the semiconductor switch may be opened as soon as the indication to open the FLCB is obtained, to further consume the fault current by forcing it to pass through yet another MOV, during the closing of the mechanical switch but before it has arrived at its closed position. It may be especially useful to open the semiconductor switch in a module during closing of the mechanical switch of that module when said mechanical switch is the last to close in the FLCB.

Figure 4:
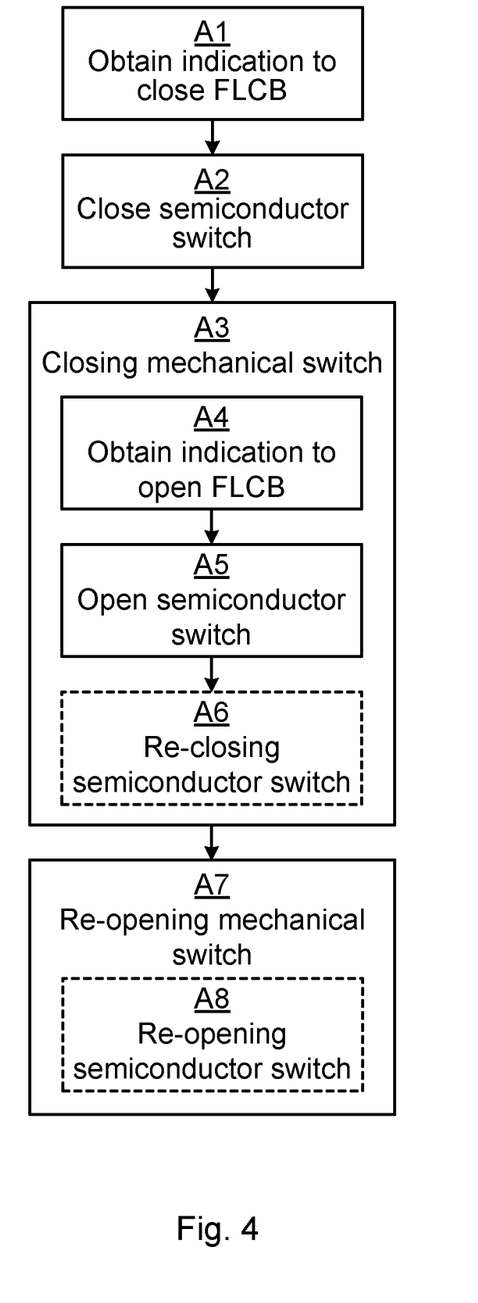
FIG. 4 is a schematic flow chart of some embodiments of an alternative method of the present invention.

FIG. 4 illustrates, for one module, the opening (and optionally also re-closing) of the semiconductor switch during the closing of the mechanical switch of that same module. The FLCB may then e.g., consist of only one module 2, or comprise a plurality of modules which are all operated simultaneously (especially where the mechanical switch of each module are closed and opened at the same time), rather than sequentially as in accordance with FIG. 3. An indication that the FLCB 1 should be closed is obtained A1. In response to the obtained A1 indication, the semiconductor switch 4a and/or 4b is closed A2. Also, the mechanical switch 3a is closing A3 in response to the obtained A1 indication, but during the closing A3 of the mechanical switch, an indication to open the FLCB is obtained A4. In response to the obtained A4 indication, the semiconductor switch is opened A5 during the closing A3 of the mechanical switch, thus forcing the fault current through the MOV 5a before the mechanical switch has reached its closed position and provides a galvanic connection. Optionally, to avoid arcing at the mechanical switch, the semiconductor switch may re-close before the mechanical switch has reached its closed position and provides a galvanic connection. Since the mechanical switch has a much longer switching duration, i.e. time period during which the mechanical switch is closing, from its open position to its closed position (at which a galvanic connection is provided), than the semiconductor switch has, the semiconductor switch may open A5, and possibly re-close A6, during the closing A3 (i.e. during the switching time) of the mechanical switch, substantially contributing to the handling of the fault current since the fault current is during this time (after opening A5 of the semiconductor switch but before the mechanical switch has reached its closed position) directed through, and thus consumed by means of, the MOV 5a.

Then, after the mechanical switch has reached its closed position, the mechanical switch can re-open A7. If the semiconductor switch has re-closed A6, it may then re-open A8 during the re-opening A7 of the mechanical switch to avoid arcing during said re-opening A7 of the mechanical switch. Thus, in case of of re-closing A6 the semiconductor switch just before the mechanical switch reaches its closed position during its closing A3, the semiconductor switch is closed to avoid arcing both at the end of the closing A3 and the re-opening A7 of the mechanical switch.

Thus, in some embodiments, during the closing S3 of the mechanical switch 3a of the first module 2a, in response to the obtaining S4b of the indication that the FLCB 1 should be opened, the method further comprises opening A5 the semiconductor switch 4a or 4b of the first module. In some embodiments, the method then also comprises re-closing A6 the semiconductor switch 4a or 4b of the first module during the closing S3 of the mechanical switch of the first module.

In some other embodiments, during the closing S4c of the mechanical switch 3a of the second module 2b, in response to the obtaining S5c of the indication that the FLCB 1 should be opened, the method further comprises opening A5 the semiconductor switch 4a or 4b of the second module. In some embodiments, the method then also comprises re-closing A6 the semiconductor switch 4a or 4b of the second module during the closing S4c of the mechanical switch of the second module.

It is noted that to open the semiconductor switch of the same module as in which the mechanical switch is in the process of closing may also be advantageous when the FLCB only has one module, or where the FLCB has a plurality of series connected modules, but the modules are not configured for closing the mechanical switches in sequence as discussed herein.

Thus, according to an alternative aspect of the present invention, there is provided a method of operating a Fault Current Limiter Circuit Breaker (FLCB) 1 comprising an FLCB module 2. The module comprises a plurality of parallel component legs comprising a mechanical switch leg 3 comprising a mechanical switch 3a, a semiconductor switch leg 4 comprising a semiconductor switch 4a or 4b, and a Metal Oxide Varistor (MOV) leg 5 comprising a MOV 5a. The method comprises, when the FLCB is in an open configuration, obtaining A1 an indication that the FLCB should be closed. The method also comprises, in response to the obtained A1 indication, closing A2 the semiconductor switch 4a or 4b. The method also comprises, after the closing A2 of the semiconductor switch, closing A3 the mechanical switch 3a. The method also comprises, during the closing A3 of the mechanical switch 3a, obtaining A4 an indication that the FLCB 1 should be opened. The method also comprises, in response to the obtaining A4 of the indication that the FLCB 1 should be opened, during the closing A3 of the mechanical switch 3a, opening A5 the semiconductor switch 4a or 4b, forcing a fault current through the MOV 5a. The method also comprises, after the closing A3 of the mechanical switch 3a, re-opening A7 the mechanical switch 3a.

In some embodiments of the alternative aspect of the present invention, the method further comprises, after the opening A5 of the semiconductor switch 4a or 4b, re-closing A6 the semiconductor switch 4a or 4b during the closing A3 of the mechanical switch 3a. In some embodiments, the method also comprises re-opening A8 the semiconductor switch 4a or 4b during the re-opening A7 of the mechanical switch 3a.

In some embodiments of the present invention, each of the mechanical switches 3a comprises a Thomson switch. A Thomson switch is an example of a relatively fast mechanical switch which may be suitable for the mechanical switches 3a.

In some embodiments of the present invention, each of the semiconductor switches 4a and/or 4b comprises an active turn-off semiconductor switch, e.g., an Insulated-Gate Bipolar Transistor (IGBT), a Bi-Mode Insulated Gate Transistor (BiGT), a Gate Turn-Off Thyristor (GTO) or an Integrated Gate-Commutated Thyristor (IGCT), e.g., a BiGT as exemplified herein which may be preferred in some embodiments.

In some embodiments of the present invention, the respective semiconductor switch leg 4 of each module 2 comprises a bi-directional semiconductor switch arrangement 4a and 4b, e.g., comprising two BiGT in series but with different polarities as exemplified in FIG. 1. A bi-directional semiconductor switch arrangement may be needed for AC applications, while some DC applications may function using mono-directional semiconductor switch arrangements, e.g., comprising a single BiGT.

In some embodiments of the present invention, each of the mechanical switches 3a has a switching duration within the range of 5-10 ms.

In some embodiments of the present invention, each of the semiconductor switches (4a, 4b) has a switching duration within the range of 5-15 µs.

In some embodiments of the present invention, the plurality of parallel component legs comprises a snubber leg 6 comprising a resistance 6a and a capacitance 6b in series, thus providing a conventional RC snubber circuit.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) 92 having instructions 93 stored thereon/in, in the form of computer-executable components or software (SVV), which can be used to program a computer 9 to perform any of the methods/processes of the present invention. Examples of the storage medium 92 can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of operating a Fault Current Limiter Circuit Breaker, FLCB, comprising a plurality of FLCB modules connected in series, including at least a first module and a second module, each module including a plurality of parallel component legs comprising:
   a mechanical switch leg comprising a mechanical switch;
   a semiconductor switch leg comprising a semiconductor switch; and
   a Metal Oxide Varistor, MOV, leg including a MOV;
   the method comprising:
      when the FLCB is in an open configuration, obtaining an indication that the FLCB should be closed;
      in response to the obtained indication, closing the semiconductor switch of each of the modules; and
      after the closing of the semiconductor switches and while the mechanical switch of the second module remains open, closing the mechanical switch of the first module.

2. The method of claim 1, further comprising:
   after the closing of the mechanical switch of the first module, closing the mechanical switch of the second module; and
   when the mechanical switch of each of the plurality of modules has been closed, opening the semiconductor switch of each of the modules.

3. The method of claim 1, further comprising:
   during the closing of the mechanical switch of the first module, while the mechanical switch of the second module remains open, obtaining an indication that the FLCB should be opened;
   in response to the obtaining of the indication that the FLCB should be opened, opening the semiconductor switch of the second module, forcing a fault current through the MOV of the second module; and
   after the opening of the semiconductor switch of the second module, opening the mechanical switch of the first module and the semiconductor switch of the first module.

4. The method of claim 3, further comprising:
   during the closing of the mechanical switch of the first module, in response to the obtaining of the indication that the FLCB 1 should be opened, opening the semiconductor switch of the first module; and
   during the closing of the mechanical switch of the first module, re-closing the semiconductor switch of the first module.

5. The method of claim 1, further comprising:
   after the closing of the mechanical switch of the first module, closing the mechanical switch of the second module;
   during the closing of the mechanical switch of the second module, while the mechanical switch of the first module remains closed, obtaining an indication that the FLCB should be opened;
   in response to the obtaining of the indication that the FLCB should be opened, opening the mechanical switch of the first module and the semiconductor switch of the first module, forcing a fault current through the MOV of the first module; and
   after the opening of the semiconductor switch of the first module, opening the mechanical switch of the second module and the semiconductor switch of the second module.

6. The method of claim 5, further comprising:
   during the closing of the mechanical switch of the second module, in response to the obtaining of the indication that the FLCB should be opened, opening the semiconductor switch of the second module; and
   during the closing of the mechanical switch of the second module, re-closing the semiconductor switch of the second module.

7. The method of claim 1, wherein each of the mechanical switches comprises a Thomson switch.

8. The method of claim 1, wherein each of the semiconductor switches comprises an active turn-off semiconductor switch, e.g., an Insulated-Gate Bipolar Transistor, IGBT; a Bi-Mode Insulated Gate Transistor, BiGT; a Gate Turn-Off Thyristor, GTO; or an Integrated Gate-Commutated Thyristor, IGCT.

9. The method of claim 1, wherein each of the semiconductor switch legs comprises a bi-directional semiconductor switch arrangement, e.g., including two BiGT in series but with different polarities.

10. The method of claim 1, wherein each of the mechanical switches has a switching duration within the range of 5-10 ms.

11. The method of claim 1, wherein each of the semiconductor switches has a switching duration within the range of 5-15 µs.

12. The method of claim 1, wherein the plurality of parallel component legs comprises a snubber leg including a resistance and a capacitance in series.

13. A computer program product comprising computer-executable components for causing a controller to perform the method of claim 1 when the computer-executable components are run on processing circuitry included in the controller.

14. A Fault Current Limiter Circuit Breaker, FLCB, comprising a plurality of FLCB modules connected in series, including at least a first module and a second module, each module including a plurality of parallel component legs comprising:
- a mechanical switch leg comprising a mechanical switch;
- a semiconductor switch leg comprising a semiconductor switch;
- a Metal Oxide Varistor, MOV, leg including a MOV; and
- a controller comprising processing circuitry, and data storage storing instructions executable by said processing circuitry whereby said controller is operative to:
  - when the FLCB is in an open configuration, obtain an indication that the FLCB should be closed;
  - in response to the obtained indication, close the semiconductor switch of each module; and
  - while the semiconductor switches are closed and the mechanical switch of the second module remains open, close the mechanical switch of the first module.

15. A power distribution network comprising a Fault Current Limiter Circuit Breaker, FLCB, having a plurality of FLCB modules connected in series, including at least a first module and a second module, each module having a plurality of parallel component legs with:
- a mechanical switch leg;
- a semiconductor switch leg;
- a Metal Oxide Varistor, MOV, leg; and
- a controller with processing circuitry, and data storage storing instructions executable by said processing circuitry whereby said controller is operative to:
  - when the FLCB is in an open configuration, obtain an indication that the FLCB should be closed;
  - in response to the obtained indication, close the semiconductor switch of each module; and
  - while the semiconductor switches are closed and the mechanical switch of the second module remains open, close the mechanical switch of the first module.

* * * * *